US012451661B2

(12) United States Patent
Daughtry et al.

(10) Patent No.: US 12,451,661 B2
(45) Date of Patent: Oct. 21, 2025

(54) IMPEDANCE-MATCHED HIGH-CURRENT G-TYPE RF CONNECTOR

(71) Applicant: Genesis Technology USA, Inc., Lawrenceville, GA (US)

(72) Inventors: Earl Anthony Daughtry, Lawrenceville, GA (US); Taochuan Chen, Duluth, GA (US)

(73) Assignee: Genesis Technology USA, Inc., Lawrenceville, GA (US)

( * ) Notice: Subject to any disclaimer, the term of this patent is extended or adjusted under 35 U.S.C. 154(b) by 774 days.

(21) Appl. No.: 17/736,335

(22) Filed: May 4, 2022

(65) Prior Publication Data

US 2023/0361515 A1 Nov. 9, 2023

(51) Int. Cl.
*H01R 24/44* (2011.01)
*H01R 103/00* (2006.01)

(52) U.S. Cl.
CPC ......... *H01R 24/44* (2013.01); *H01R 2103/00* (2013.01)

(58) Field of Classification Search
CPC ................................ H01R 24/44; H01R 24/38
See application file for complete search history.

(56) References Cited

U.S. PATENT DOCUMENTS

| | | | | |
|---|---|---|---|---|
| 2,767,267 A * | 10/1956 | Zink, Jr. | H01R 24/40 | 200/51.1 |
| 3,871,735 A * | 3/1975 | Herrmann, Jr. | H01R 13/53 | 439/585 |
| 4,033,654 A * | 7/1977 | Ross | H01R 13/6583 | 439/840 |
| 4,431,255 A * | 2/1984 | Banning | H01R 9/0521 | 439/578 |
| 5,011,415 A * | 4/1991 | Suzuki | H01R 24/50 | 439/63 |
| 5,807,117 A * | 9/1998 | Kempf | H01R 13/18 | 439/63 |
| 6,302,739 B1 * | 10/2001 | Deno | H01R 13/6582 | 439/607.17 |
| 10,044,152 B2 * | 8/2018 | Rajpal | H01R 24/38 | |
| 11,658,435 B2 * | 5/2023 | Li | H01R 24/38 | 439/382 |
| 11,848,516 B2 * | 12/2023 | Scheer | H01R 13/17 | |
| 2023/0361515 A1 * | 11/2023 | Daughtry | H01R 24/44 | |

* cited by examiner

*Primary Examiner* — Neil Abrams
(74) *Attorney, Agent, or Firm* — Coffield Heedy Kilgore PLLC; Charles L. Warner

(57) ABSTRACT

An electrical connecter (400), such as a jack, has a mating end (402), a first barrel (404), an optional collar (406), a second barrel (408), a body end (410), a center receptacle (412), a first solid dielectric (502) at the mating end of the first barrel, and second solid dielectric (504) at the body end (410) of the second barrel. The first section of the barrel has a smooth and uniform outer wall (404A). This allows the inner diameter (DIS) of the first section of the barrel to be increased without reducing the thickness (T) of the first section of the barrel below a minimum value, and allows the outer diameter (DOC) of the center conductor in the vicinity of the first section of the barrel to be increased to provide for a greater current-handling capability. This provides for maintaining a desired impedance even with the greater current-handling capability.

18 Claims, 4 Drawing Sheets

IMPEDANCE-MATCHED HIGH-CURRENT G-TYPE RF CONNECTOR

BACKGROUND

The G-type RF connector is a non-threaded version of the F-Type RF connector, used in CATV applications in 75-ohm impedance applications, and is often used for blind mate applications.

FIG. 1 is a cross sectional drawing of a conventional G-type plug 100, sometimes commonly referred to as a male connector, showing a barrel 102, optional threads 104, a center pin 106, a base insulator 108, and an optional flange 110.

FIG. 2 is an illustration of a conventional G-type jack 200, sometimes commonly referred to as a receptacle or a female connector, showing a plurality of grounding springs 216.

FIG. 3 is an illustration of a cross section view 300 along line A-A of the connector 200 of FIG. 2 showing a mating end 202, a first barrel 204, a collar 206, a body 210, a center conductor 212 (also referred to herein as a center receptacle as it receives the center pin of the plug), an insulator 214, a grounding spring 216, a front flange 218 for captivation/retention of the grounding springs 216, and the parameters DOC, DOS, DIS, T, and TM. The body 210 may be threaded, as shown, or may be smooth. In a conventional G-type jack 200, DIS is 1.6 mm and DOC is 2.2 mm.

For a coaxial line, the impedance Zo of the line can be determined as:

$$Zo = 138 * \log_{10}\left(\frac{DIS}{DOC}\right) / \sqrt{\varepsilon_r} \tag{1}$$

where DIS is the inner diameter of the shield, DOC is the outer diameter of the center receptacle, and $\varepsilon_r$ is the relative dielectric constant of the insulator between the shield and the center receptacle.

In the original implementation of the G-connector, the center pin diameter was 1.07 mm and the current rating for the center pin was estimated to be about 5 amps. Subsequent uses had higher power requirements so the current handling capacity of the center pin, and therefore the size of the center pin, had to increase. Conventional high current G-type connectors are rated up to 15 amps and have a center pin diameter of up to about 1.52 mm.

Using coaxial transmission line principles, and equation (1) above, an electrical connector can have a desired 75-ohm intrinsic impedance by selecting the center pin diameter DOC, the inner diameter DIS of the shell or barrel 204, and the insulator. It will be understood that, with respect to an electrical connector, the insulator may be a combination of air and a solid insulator so the effective dielectric constant will generally be greater than the dielectric constant of air but less than the dielectric constant of the solid insulator. As the diameter DOC of the center pin 212 increases, however, and assuming that the dielectric of the insulator does not change, then the inner diameter DIS of the barrel 204 has to increase in order to achieve the same impedance.

The outer diameter DOS of the barrel of the jack 200 has to fit inside the inner diameter of the barrel of the plug 100. Further, with many circuit board designs, components, including connectors, are packed as closely as possible in order to minimize size and/or cost; and automated manufacturing devices are designed to accommodate specified component dimensions and tolerances. Therefore, if compatibility with earlier designs and devices is to be achieved, neither the outer diameter of the barrel of the plug 100 nor the outer diameter DOS of the barrel 204 of the jack 200 can be increased.

Furthermore, the nominal thickness T of the barrel 204 of the jack 200 is the difference between the maximum outer diameter DOS of the barrel 204 and the inner diameter DIS of the barrel 204. However, the jack 200 has a grounding spring 216, which has a thickness as well, so the minimum thickness TM of the barrel 204 will be less than the nominal thickness T in the area where the grounding spring 216 is present. Furthermore, the front flange 218 provides a recess to captivate/retain the grounding springs 216. Therefore, as the inner diameter DIS increases, the minimum thickness TM will decrease if DOS is held constant. There is a limit, however, to the minimum thickness TM that can be achieved. Below that minimum thickness, the structural integrity of the barrel 204 is compromised and the barrel 204 may bend, collapse, tear, or otherwise deform when the jack 200 and the plug 100 are being mated.

For a conventional 15-amp current rating G-Type jack 200, the inner diameter DIS is 6.5 mm and the wall thickness T is 0.9 mm. This, however, does not provide for a 75 ohm impedance, so there may be an impedance mismatch between the connectors and the connected circuitry or cable. An impedance mismatch can cause less than optimal RF performance due to signal reflections and power loss. The reduction in RF performance has generally been tolerated in order to accommodate the greater current-handling demands of current systems but newer systems use higher frequencies and the impedance mismatch presents more serious RF performance problems.

SUMMARY OF THE INVENTION

An electrical connecter, such as a jack, has a mating end, a first barrel, an optional collar, a second barrel, a body end, a center receptacle, a first solid dielectric at the mating end of the first barrel, and second solid dielectric at the body end of the second barrel. The first section of the barrel has a smooth and uniform outer wall. This allows the inner diameter of the first section of the barrel to be increased without reducing the thickness of the first section of the barrel below a minimum value, and allows the outer diameter of the center conductor in the vicinity of the first section of the barrel to be increased to provide for a greater current-handling capability. This provides for maintaining a desired impedance even with the greater current-handling capability.

A high-current, impedance-matched electrical connecter, such as a plug, has a barrel, optional exterior threads over at least a portion of the barrel, a center pin, a base insulator, an optional flange, and an internal grounding spring inside the barrel, forward of the base insulator, and electrically contacting the inner wall of the barrel.

DETAILED DESCRIPTION OF THE INVENTION

Figure 1:
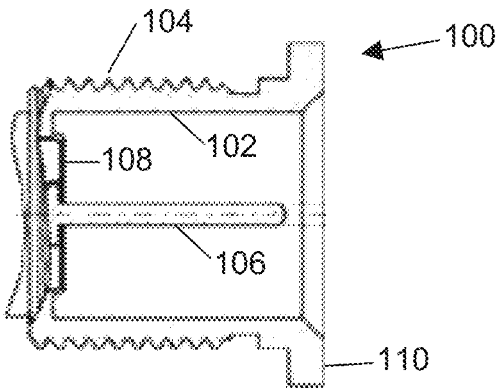
PRIOR ART FIG. 1
FIG. 1 is a cross sectional drawing of a conventional G-type plug.

Turn now to the drawing, in which like numerals and letters reference like components throughout the several Figures.

Figure 4:
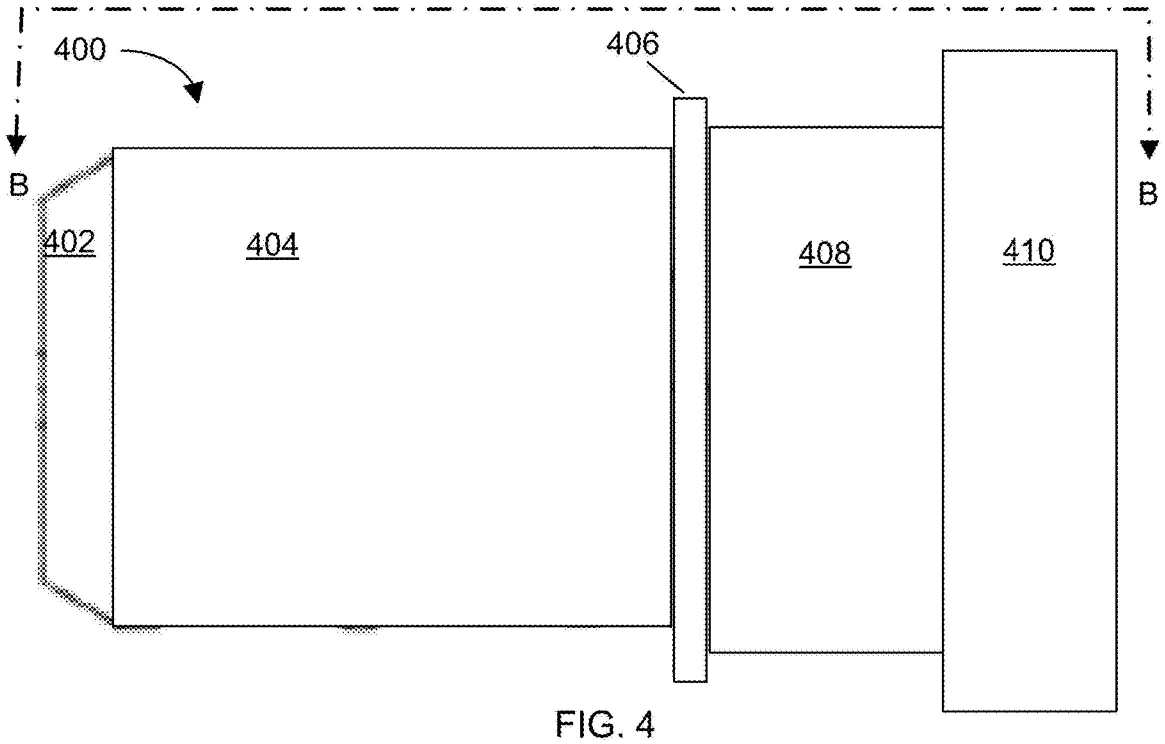
FIG. 4 is an illustration of a G-type jack with improved impedance characteristics.

FIG. 4 is an illustration of a G-type jack 400 with improved impedance characteristics, showing a mating end 402, a first barrel 404, a collar 406, a second barrel 408, and a body end 410.

Figure 5:
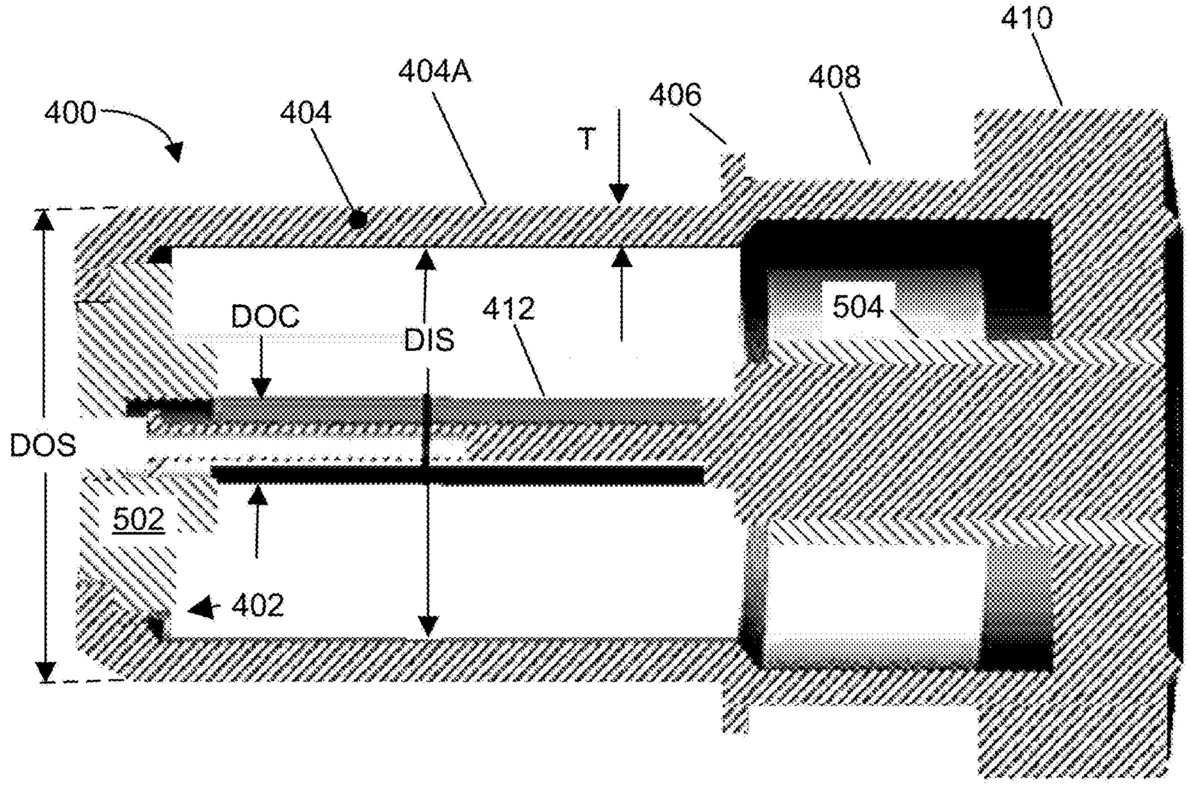
FIG. 5 is an illustration of a cross section view along line B-B of the connector of FIG. 4.

FIG. 5 is an illustration of a cross section view along line B-B of the connector of FIG. 4, showing the first barrel 404, the collar 406, the second barrel 408, the body end 410, a center receptacle 412, a first solid dielectric 502 at the mating end 402 of the first barrel 404, and a second solid dielectric 504 at the body end 410.

In an embodiment, the outer wall 404A of the first barrel 404 is smooth so that the connector 400 may be inserted into, and withdrawn from, the connector 700 using a force that does not distort, tear, bend, or otherwise deform the connector 400, and is uniform, that is, not interrupted by another component, such as grounding springs 216.

Figure 6:
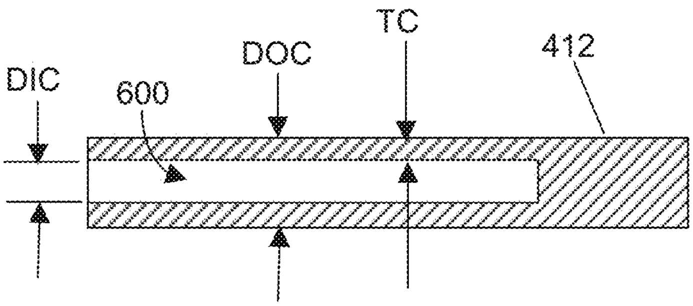
FIG. 6 is a partial cross sectional view of the center receptacle of the connector of FIG. 4.

FIG. 6 is a partial cross sectional view of the center receptacle 412. The center receptacle 412 has a partial void or opening 600 to accommodate the center pin of a corresponding plug, such as plug 100. The inner diameter DIC of the center receptacle 412 is preferably fixed to maintain compatibility with the conventional plug 100. An increase in the outer diameter DOC of the center receptacle 412 while maintaining the inner diameter 412 provides for a greater thickness TC for the center receptacle 412, thereby accommodating a larger current flow. Referring to equation (1) above, it will be seen that an increase in outer diameter DOC results in a decrease in the impedance of the connector 400 if all other factors are maintained. If, however, the inner diameter DIS of the barrel 404 is increased then there is an increase in the impedance, thereby resulting in improved RF performance.

As mentioned above, however, as the inner diameter DIS increases, the minimum thickness TM will decrease if DOS is held constant and there is a limit to the minimum thickness TM which can be used.

Figure 2:
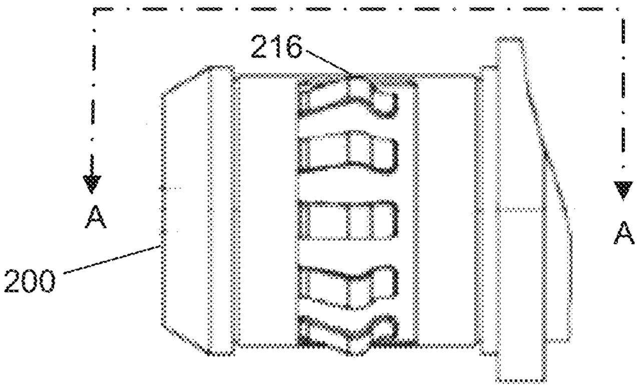
PRIOR ART FIG. 2
FIG. 2 is an illustration of a conventional G-type jack.

As the grounding springs 216 of the conventional jack 200 of FIG. 2 are not used in the connector of FIG. 4 then they do not affect the thickness T of the first barrel 404. Also, by not using the grounding springs 216 then the exterior diameter DOS of the first barrel 404 may be constant along the length of the first barrel 404; that is, the exterior of the first barrel 404 is not substantially interrupted by indentations or protuberances, such as caused by the grounding springs 216 of the conventional jack 200 of FIG. 2. The front flange feature of 218 is also eliminated as there are no grounding springs 216 to be captivated/retained. Also, the first barrel 404 of the jack 400 has a constant interior diameter DIS; that is, the interior of the first barrel 404 is not substantially interrupted by indentations or protuberances. As the thickness T of the first barrel 404 is one-half of the difference between the diameters DIS and DOS, and they are both are constant along the length of the first barrel 404, then the thickness T of the first barrel 404 is also constant.

Further, as grounding springs 216 are not present, the interior diameter DIS of the first barrel 404 of the connector 400 can be larger than the interior diameter DIS of the connector 200 while still maintaining the desired thickness T of the barrel 404. This allows the outer diameter DOC of the center receptacle 412 of the connector 400 to be larger than the outer diameter DOC of the center receptacle 212 of the connector 200, thereby accommodating a larger current flow while still achieving a desired impedance.

Figure 3:
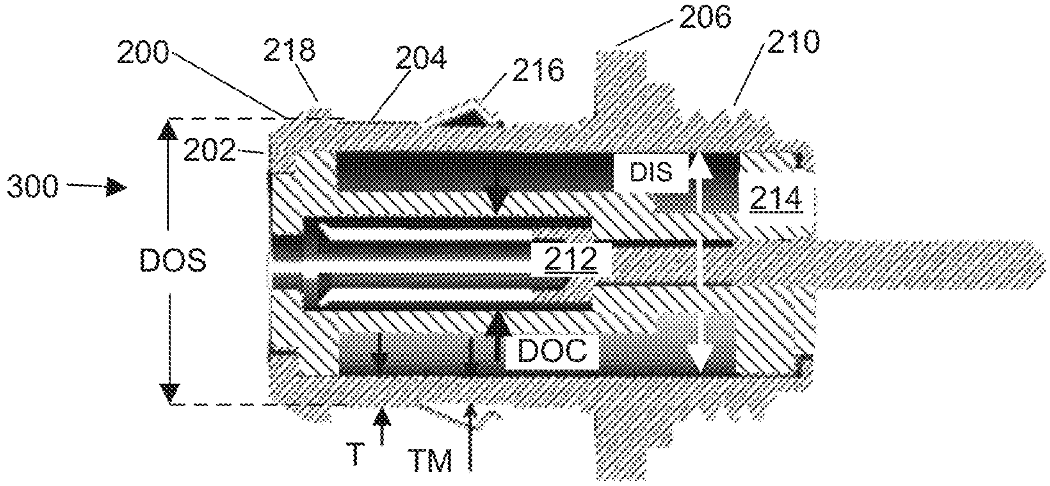
PRIOR ART FIG. 3
FIG. 3 is an illustration of a cross section view along line A-A of the connector of FIG. 2.

Referring briefly to FIGS. 1 and 3, it will be noted that the jack 200 has a front flange 218. The front flange 218 fits into the plug 100 and is also larger than the outer diameter DOS of the front barrel 204.

Returning now to FIG. 4, in an embodiment, the connector 400 does not have the front flange 218 of the connector 200 so that the outer diameter DOS of the front barrel 404 is the same as the maximum diameter of the mating end 402. This allows the outer diameter DOS of the front barrel 404 to be larger than the outer diameter the front barrel 204 so that the inner diameter DIS of the front barrel 404 may be increased without reducing the thickness T of the front barrel 404 below the minimum allowable. This also allows the outer diameter DOC of the center receptacle 412 of the connector 400 to be larger than the outer diameter DOC of the center receptacle 212 of the connector 200, thereby accommodating a larger current flow while still achieving a desired impedance.

Figure 7:
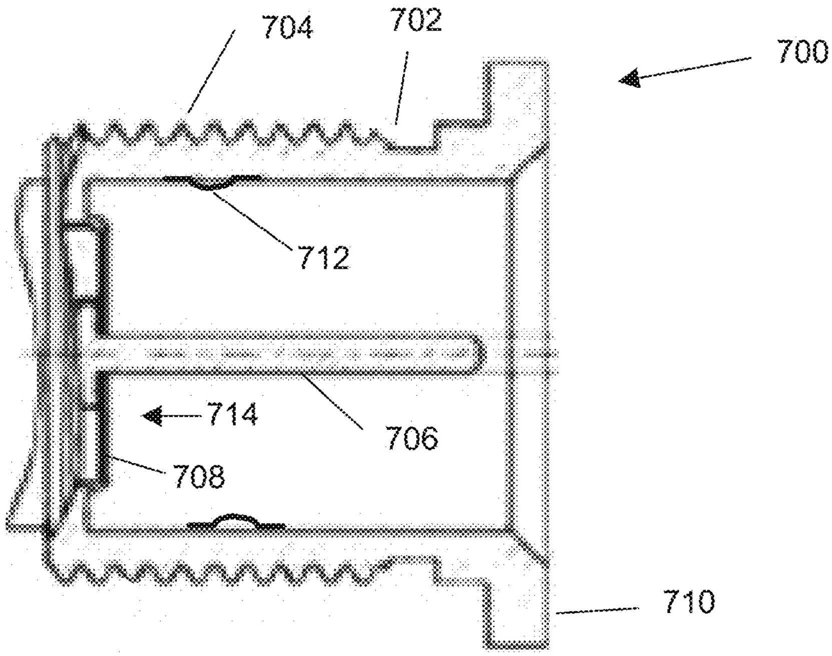
FIG. 7 is a cross sectional drawing of a G-type plug usable with both the jack of FIG. 2 and the jack of FIG. 4.

FIG. 7 is a cross sectional drawing of a G-type plug 700 usable with both the jack 200 of FIG. 2 and the jack 400 of FIG. 4, and showing a barrel 702, optional exterior threads 704 over at least a portion of the barrel 702, a center pin 706, a base insulator 708, an optional flange 710, and internal grounding springs 712.

In an embodiment, the internal grounding springs 712 are preferably set toward the rear 714 of the plug 700. This allows the plug 700 to be used with the conventional jacks 200. The grounding springs 712 may be set more forwardly but should not be set so forward that they can become entangled with the grounding springs 216 of the conventional jack 200. If the plug 700 will not be used with conventional jacks 200 then the grounding springs 712 may be placed at any desired point inside the barrel 702.

Figure 8:
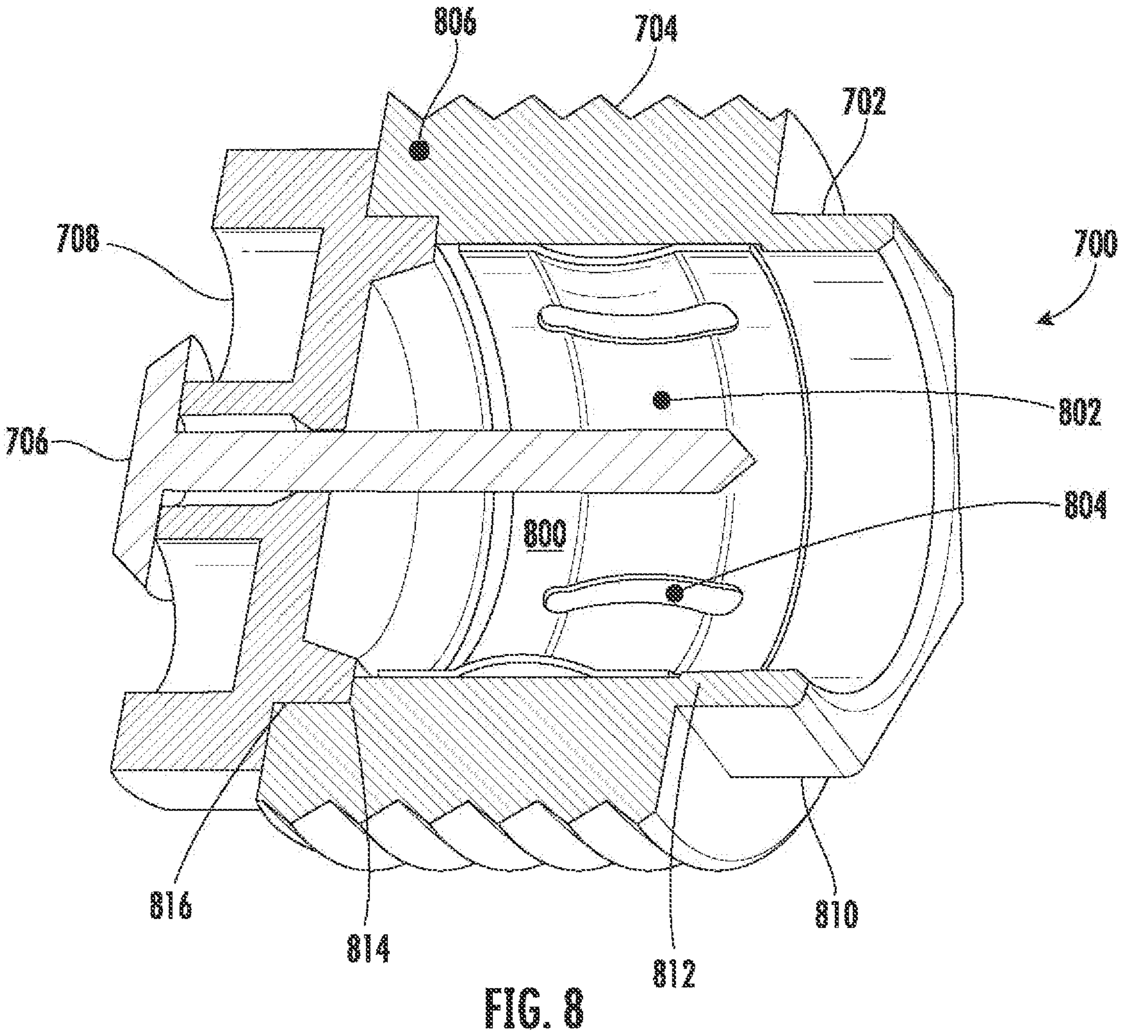
FIG. 8 is a cross sectional drawing of the plug of FIG. 7 configured for use as a seizure interface plug.

FIG. 8 is a cross sectional drawing of the plug of FIG. 7 configured for use as a seizure interface plug and so includes the optional threads 704 of FIG. 7. For blind-mate applications, especially in outdoor industrial applications, a "seizure interface" plug may be used and is typically threaded into another assembly which will connect to an external cable.

In an embodiment, the internal grounding springs 712 are embodied in a spring gasket 800, i.e., a metal band 802 with a plurality of slots 804 in it, as shown in FIG. 8.

In an embodiment, the barrel 702 has a first inner diameter from the mating end 810 to a first point 812, a second inner diameter from the first point 812 to a second point 814, and a third inner diameter from the third point 814 to the body end 806, the first inner diameter being less than the second inner diameter, and the second inner diameter being less than the third inner diameter. The insulator 708 fits into the barrel 702 at the body end 806, and has a fourth inner diameter, which is smaller than the second inner diameter. Therefore, the spring gasket 800 is held in position between points 812 and 814 by the first inner diameter of the barrel 702 and the fourth inner diameter of the insulator 708 being smaller than the second inner diameter of the barrel 702.

In an embodiment, the inner diameter of the barrel 702 where the threads 704 are present is slightly larger than the inner diameter of the barrel 702 forward of the threads 704 so as to accommodate the spring gasket 800 while still presenting a substantially uniform inner diameter throughout the connector 700.

The spring gasket 800 may be slightly compressed or curled, inserted into the barrel 702, and then allowed to expand to that it is seated tightly inside the barrel 702. The center pin 706 and insulator 708 are then inserted into the distal or body end 806 of the barrel 702.

In an embodiment, the inner diameter of the barrel 702 at the distal end 806 is slightly larger so as to accommodate the insulator 708. The center pin 706 may be press-fit into the insulator 708, and the insulator 708 may be press-fit into the back end 806 of the barrel 702.

In an embodiment, the outer diameter DOC of the center receptacle 412 of the jack 400 is 2.2 millimeters (86 mils).

In an embodiment, the outer diameter DOS of the barrel 404 of the jack 400 is 9.4 mm.

In an embodiment, the inner diameter DIS of the barrel 404 of the jack 400 is 7.6 mm.

In an embodiment, the wall thickness T of the barrel 404 of the jack 400 is 0.9 mm.

In an embodiment, the outer diameter DOC of the center receptacle 412 of the jack 400 is 2.2 mm.

In an embodiment, the inner diameter DIC of the center receptacle 412 of the jack 400 is 1.6 mm.

In an embodiment, the jack 400 has an impedance of approximately 75 ohms.

In an embodiment, the inner diameter of the barrel 702 of the plug 700 is at least 9.7 mm.

In an embodiment, the outer diameter DOC of the center pin 706 of the plug 700 is 1.6 mm.

In an embodiment, the plug 700 has an impedance of approximately 75 ohms.

In an embodiment, the position of the spring gasket 712 of the plug 700 is selected to be compatible with a conventional G-type plug 200.

In an embodiment, the insulators/dielectrics 502, 504, and 708 are Teflon (PTFE) with a dielectric constant of 2.1.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term “exemplary” is used herein to mean serving as an example, instance, or illustration. Any aspect or design described herein as “exemplary” is not necessarily to be construed as preferred or advantageous over other aspects or designs. Similarly, examples are provided herein solely for purposes of clarity and understanding and are not meant to limit the subject innovation or portion thereof in any manner.

The terms “for example” and “such as” mean “by way of example and not of limitation.” The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms “a,” “an,” and “the” are intended to include the plural forms as well, unless expressly stated otherwise or the context indicates otherwise.

It will be further understood that the terms “includes,” “comprises,” “including,” and/or “comprising” specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms “includes,” “has” or “having” or variations in form thereof are intended to be inclusive in a manner similar to the term “comprises” as that term is interpreted when employed as a transitional word in a claim.

It will be understood that when a component is referred to as being “connected” or “coupled” to another component, it can be directly connected or coupled, or coupled by one or more intervening components, unless expressly stated otherwise or the context clearly indicates otherwise.

The term “and/or” includes any and all combinations of one or more of the associated listed items. As used herein, phrases such as “between X and Y” and “between about X and Y” should be interpreted to include X and Y unless expressly stated otherwise or the context clearly indicates otherwise.

Terms such as “about”, “approximately”, and “substantially” are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of “approximately X inches” is recited, a lower or higher height is still “approximately X inches” if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, “can”, “could”, “might”, or “may”, unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention.

Accordingly, the disclosed subject matter is intended to embrace all alterations, modifications, and variations, that fall within the scope and spirit of any claims that are written, or may be written, for the subject invention.

What is claimed is:

1. An electrical connector with controlled impedance properties, the electrical connector compromising:
- a barrel having a mating end, a center section, an inner wall, and a body end;
- a center pin, coaxial with the barrel, and having a tip near, but not extending beyond, the mating end of the barrel;
- a solid dielectric between the center pin and the barrel at the end of the barrel; and
- a grounding spring, inside the barrel, forward of the dielectric, and electrically contacting the inner wall of the barrel;
- wherein the barrel has a first inner diameter from the mating end to a first point, a second inner diameter from the first point to a second point, and a third inner diameter from the third point to the body end, the first inner diameter being less than the second inner diameter, and the second inner diameter being less than the third inner diameter.

2. The electrical connector of claim 1, wherein the grounding spring is near the body end of the barrel.

3. The electrical connector of claim 1, wherein the first inner diameter is at least 9.4 millimeters.

4. The electrical connector of claim 1, wherein:
- the solid dielectric has a fourth inner diameter, the fourth inner diameter being less than the second inner diameter;
- the grounding spring is a spring gasket; and
- the grounding spring is retained between the mating end and the solid dielectric by the first inner diameter and the fourth inner diameter being less than the second inner diameter.

5. The electrical connector of claim 1, wherein at least a portion of an exterior of the barrel is threaded.

6. The electrical connector of claim 1, wherein the center pin has an outer diameter of 1.6 millimeters.

7. The electrical connector of claim 1, having an impedance of approximately 75 ohms.

8. An electrical connector set with controlled impedance properties, the electrical connector set comprising:
- a plug having a barrel, a center pin, a solid dielectric, and a grounding spring;
  - the barrel of the plug having a mating end, a center section, an inner wall, and a body end;
  - the center pin being coaxial with the barrel of the plug and having a tip near, but not extending beyond, the mating end of the barrel of the plug;
  - the solid dielectric being between the center pin and the barrel at the body end of the barrel of the plug; and
  - the grounding spring being inside the barrel of the plug, forward of the dielectric, and electrically contacting the inner wall of the barrel of the plug;
  - wherein the barrel of the plug has a first inner diameter from the mating end to a first point, a second inner diameter from the first point to a second point, and a third inner diameter from the third point to the body end, the first inner diameter being less than the second inner diameter, and the second inner diameter being less than the third inner diameter; and
- a jack having a barrel, a first solid dielectric, a second solid dielectric, and a center receptacle;
  - the barrel of the jack having a mating end, a first section, a second section, and a body end,
    - the first section having an inner wall and a smooth outer wall, the inner wall having a first inner diameter,
    - the second section having an inner wall, the inner wall having a second inner diameter, the second inner diameter being greater than the first inner diameter;
  - the first solid dielectric connected to the barrel of the jack at the mating end;
  - the second solid dielectric being at the body end of the second section of the barrel of the jack; and
  - the center receptacle extending through the first solid dielectric and the second solid dielectric;
- wherein the barrel of the jack fits inside the barrel of the plug;
- wherein the pin of the plug fits inside the center receptacle of the jack; and
- wherein the grounding spring of the plug contacts the barrel of the jack when the jack is mated with the plug.

9. The electrical connector of claim 8, wherein:
- the center receptacle has a first section and a second section;
- the first section of the center receptacle being coaxial with the first section of the barrel of the plug and having a first outer diameter, and
- the second section of the center receptacle being coaxial with the second section of the barrel of the plug and having a second outer diameter, the second outer diameter being greater than the first outer diameter.

10. The electrical connector set of claim 8, wherein the first section of the center receptacle is configured to receive a center pin of a plug.

11. The electrical connector set of claim 8, wherein an exterior surface of the mating end of the barrel of the plug tapers inwardly.

12. The electrical connector set of claim 8, wherein the first section of the center receptacle has an outer diameter of 1.6 millimeters.

13. The electrical connector set of claim 8, wherein the first section of the barrel of the plug has an outer diameter of 9.4 millimeters.

14. The electrical connector set of claim 8, wherein the first section of the barrel of the plug has an inner diameter of 7.6 millimeters.

15. The electrical connector set of claim 8, wherein the first section of the barrel of the plug has a wall thickness of 1.8 millimeters.

16. The electrical connector set of claim 8, wherein the center receptacle has an outer diameter of 2.2 millimeters.

17. The electrical connector set of claim 8, wherein the center receptacle has an inner diameter of 7.6 millimeters.

18. The electrical connector set of claim 8, wherein at least one of the plug or the jack has an impedance of approximately 75 ohms.

* * * * *